(12) United States Patent
Van Der Kooi et al.

(10) Patent No.: US 11,918,174 B2
(45) Date of Patent: Mar. 5, 2024

(54) VACUUM CLEANER HAVING TUBE AND HOSE

(71) Applicant: KONINKLIJKE PHILIPS N.V., Eindhoven (NL)

(72) Inventors: Johannes Tseard Van Der Kooi, Munein (NL); Mark Elzinga, Borger (NL); Bastian Cornelis Kleine-Doepke, Zuidhorn (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 448 days.

(21) Appl. No.: 17/285,502

(22) PCT Filed: Nov. 21, 2019

(86) PCT No.: PCT/EP2019/082002
§ 371 (c)(1),
(2) Date: Apr. 15, 2021

(87) PCT Pub. No.: WO2020/109118
PCT Pub. Date: Jun. 4, 2020

(65) Prior Publication Data
US 2021/0378470 A1    Dec. 9, 2021

(30) Foreign Application Priority Data
Nov. 29, 2018   (EP) ..................................... 18209329

(51) Int. Cl.
*F16L 9/00* (2006.01)
*A47L 9/24* (2006.01)
(52) U.S. Cl.
CPC ............... *A47L 9/242* (2013.01); *A47L 9/248* (2013.01); *F16L 9/006* (2013.01); *Y10S 138/11* (2013.01)

(58) Field of Classification Search
CPC .. A47L 9/248; F16L 9/00; F16L 9/006; Y10S 138/11
(Continued)

(56) References Cited

U.S. PATENT DOCUMENTS 1,960,557 A  *  5/1934   Snyder .................. F16L 43/001
                                                                  138/155
2,450,195 A  *  9/1948   Grantham ............... F16L 43/02
                                                                  285/341
(Continued)

FOREIGN PATENT DOCUMENTS

CN          101035456 A      9/2007
CN          201462278        5/2010
(Continued)

OTHER PUBLICATIONS

International Search Report and Written Opinion dated Feb. 11, 2020 for International Application No. PCT/EP2019/082002 Filed Nov. 21, 2019.

*Primary Examiner* — Patrick F Brinson
(74) *Attorney, Agent, or Firm* — Maschoff Brennan

(57) ABSTRACT

Vacuum cleaner, comprising a tube having a first diameter, a hose having a second diameter exceeding the first diameter by at least 15%, and a transition piece (T) having a first end (1) arranged for being connected to the tube, and a second end (2) arranged for being connected to the hose, wherein the transition piece (T) has a curved part that has a non-circular cross-section, the curved part having a first part (I) in which in a direction from the first end (1) to the second end (2), a first dimension (R1) of the cross-section increases to a diameter exceeding the first diameter by 15%, the first dimension (R1) being in a radial direction of the curved part, while a second dimension (R2) of the cross-section, perpendicular to the first dimension (R1), does not exceed the first diameter by more than 10%. Preferably, the transition piece
(Continued)

(T) has a second part (II), between the first part (I) and the second end (2), the second part (II) having a non-circular cross-section where the second part (II) meets the first part (I), and a circular cross-section where the second part meets the second end (2). Advantageously, in the first part (I), in a direction from the first end (1) to the second end (2), the first dimension (R1) of the cross-section increases to a diameter exceeding the second diameter, while the second dimension (R2) stays below the second diameter.

5 Claims, 1 Drawing Sheet

(58) Field of Classification Search
USPC ........... 138/177, 178, 109, DIG. 11; 285/179
See application file for complete search history.

(56) References Cited

U.S. PATENT DOCUMENTS

| | | | | |
|---|---|---|---|---|
| 3,719,209 | A * | 3/1973 | Rush | B29D 23/003 |
| | | | | 4/DIG. 9 |
| 4,363,681 | A * | 12/1982 | Williams | F16L 59/22 |
| | | | | 285/47 |
| 4,410,281 | A * | 10/1983 | Crookes | B01F 25/433 |
| | | | | 366/349 |
| 5,815,883 | A | 10/1998 | Stein et al. | |
| 6,073,658 | A * | 6/2000 | Bailey | F16L 57/06 |
| | | | | 138/155 |
| 8,127,799 | B2 * | 3/2012 | Cortez | F16L 55/1608 |
| | | | | 138/155 |
| 2007/0227610 | A1 * | 10/2007 | Sakazaki | F16L 11/06 |
| | | | | 138/137 |
| 2010/0263159 | A1 | 10/2010 | Finke | |
| 2012/0325363 | A1 * | 12/2012 | Knebl | B29C 53/84 |
| | | | | 264/479 |
| 2014/0075716 | A1 * | 3/2014 | Elmenhurst | A47L 9/24 |
| | | | | 15/414 |
| 2014/0178610 | A1 * | 6/2014 | Clavelle | F16L 9/006 |
| | | | | 703/2 |
| 2014/0202577 | A1 | 7/2014 | Webster | |
| 2017/0007085 | A1 | 1/2017 | Tahara | |
| 2021/0199285 | A1 * | 7/2021 | Erisgen | F23D 14/58 |

FOREIGN PATENT DOCUMENTS

| | | | | |
|---|---|---|---|---|
| CN | 201513655 U | 6/2010 | | |
| CN | 202360950 U | 8/2012 | | |
| CN | 105423319 A | 3/2016 | | |
| CN | 205859463 U | 1/2017 | | |
| CN | 206214027 U | 6/2017 | | |
| DE | 4413223 | 10/1995 | | |
| DE | 202005003356 | 5/2005 | | |
| DE | 102007031961 A1 * | 1/2009 | | B67C 3/22 |
| EP | 2226545 | 9/2010 | | |
| FR | 2876569 | 4/2006 | | |
| JP | 2001004088 A | 1/2001 | | |
| JP | 2013192867 A | 9/2013 | | |
| JP | 2014018258 A | 2/2014 | | |
| WO | 2009/037104 | 3/2009 | | |

* cited by examiner

VACUUM CLEANER HAVING TUBE AND HOSE

CROSS REFERENCE TO RELATED APPLICATIONS

This application is the U.S. National Phase application under 35 U.S.C. § 371 of International Application No. PCT/EP2019/082002 filed Nov. 21, 2019, which claims the benefit of European Patent Application Number 18209329.4 filed Nov. 29, 2018. These applications are hereby incorporated by reference herein.

FIELD OF THE INVENTION

The invention relates to a vacuum cleaner having a tube and a hose.

BACKGROUND OF THE INVENTION

Current vacuum cleaner components have been developed in times that 2100 W input power could be used to drive a vacuum cleaner. Due to the huge amount of (air) power there was no need to develop components with a focus on low-resistance to airflow.

Currently, vacuum cleaners are being re-developed to work at low input power levels even down to 300 W, i.e. about ⅐ of original input power level. This means all components need to be optimized to have a resistance and an airflow leakage that are as low as possible to achieve the highest possible suction power at the nozzle.

US20170007085 discloses a vacuuming apparatus, wherein a hollow wand handle includes a first circumferential surface portion having a first outer diameter and a second circumferential surface portion having a second outer diameter that is larger than the first outer diameter.

SUMMARY OF THE INVENTION

It is, inter alia, an object of the invention to provide an improved vacuum cleaner. The invention is defined by the independent claims. Advantageous embodiments are defined in the dependent claims.

One aspect of the invention provides a vacuum cleaner, comprising a tube having a first diameter, a hose having a second diameter exceeding the first diameter by at least 15%, and a transition piece having a first end arranged for being connected to the tube, and a second end arranged for being connected to the hose, wherein the transition piece has a curved part that has a non-circular cross-section, the curved part having a first part in which in a direction from the first end to the second end, a first dimension of the cross-section increases to a diameter exceeding the first diameter by 15%, the first dimension being in a radial direction of the curved part, while a second dimension of the cross-section, perpendicular to the first dimension, does not exceed the first diameter by more than 10%. Preferably, the transition piece has a second part, between the first part and the second end, the second part having a non-circular cross-section where the second part meets the first part, and a circular cross-section where the second part meets the second end. Advantageously, in the first part, in a direction from the first end to the second end, the first dimension of the cross-section increases to a diameter exceeding the second diameter, while the second dimension stays below the second diameter. Preferably, the second diameter exceeds the first diameter by at least 25%, and more preferably, by at least 35%.

The invention is based on the following considerations. One of current main high-resistance components is the hose of the vacuum cleaner. Due to the small diameter in combination with the ribbed-structure the resistance of the hose is very high and a main contributor to the losses in the current vacuum cleaners. By increasing the hose diameter by 5 mm, the resistance may go down by a factor 2.

To achieve this benefit of a larger diameter, preferably not only the hose diameter itself should become larger, but also the upstream and downstream parts and connections should be adapted to prevent abrupt changes in diameter causing turbulences and thus losses.

One embodiment of this invention focusses on a solution especially for the upstream part, the bend of the vacuum cleaner, which is positioned between the tube and the hose. A problem that occurs is that the start of the bend, it needs to have the relatively small diameter of the tube, while the end of the bend needs to have the enlarged diameter of the increased hose. So the bend has to be shaped as a diffuser (increasing diameter and always circular). However, the bend is being used as handle/grip for the vacuum cleaner therefor it has a curved shape. A problem that occurs is that a curved shape in combination with an increasing diameter delivers conflicts. A main conflict is that due to an airflow in a bend having an increasing diameter, additional turbulences occur. If the bend increases in diameter in all directions, the turbulences will not only occur in the upper and lower corner but also at the sides of the corner leading to more turbulence. As more turbulence leads to more resistance, this will result in more losses.

An embodiment of this invention provides a solution on how to design a flow-efficient diffusing bend, by using an oval cross section: provide an increased diameter in a first direction (a radial direction of the curve) and (substantially) not in a second direction perpendicular to the first direction. As the flow will separate in the upper and lower corner of the bend, increasing the cross-section there will have no negative impact on the resistance. Increasing the cross-section there will give more space for the air to 'turn the corner'. Therefore, the flow will experience the diffusing tube in this direction as a less 'steep' corner and therefore giving a lower resistance. Because of (substantially) not increasing the bend in the sideway (perpendicular to the radial direction, the width of the bend when viewed in the radial direction of the curve) direction, the flow will not separate on the sides of the corner. This will lead to a lower total resistance of the bend while diffusing to a bigger diameter. As a result of manufacturing constraints, the dimension in the second direction may not be entirely constant.

These and other aspects of the invention will be apparent from and elucidated with reference to the embodiments described hereinafter.

DESCRIPTION OF EMBODIMENTS

Figure 1:
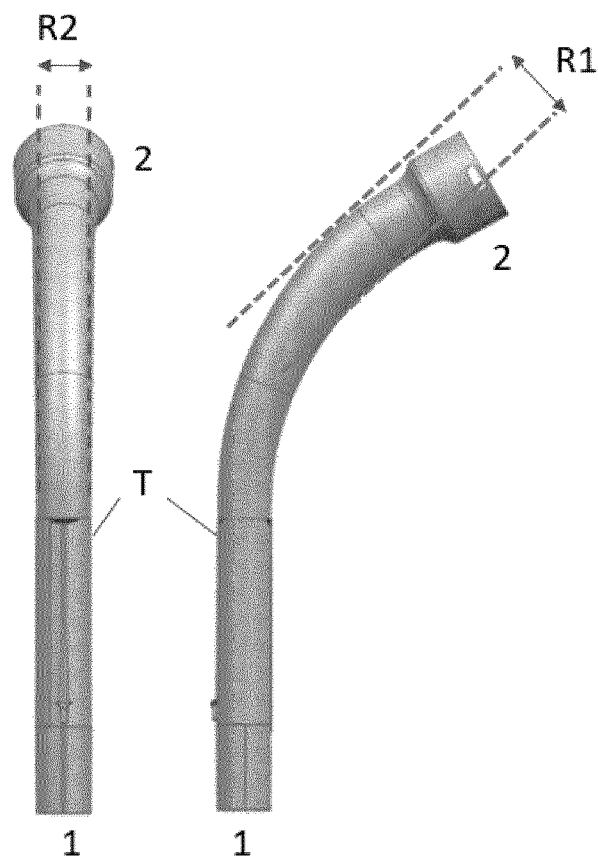
FIGS. 1 and 2 shows a transition piece according to an embodiment of the invention.
Figure 2:
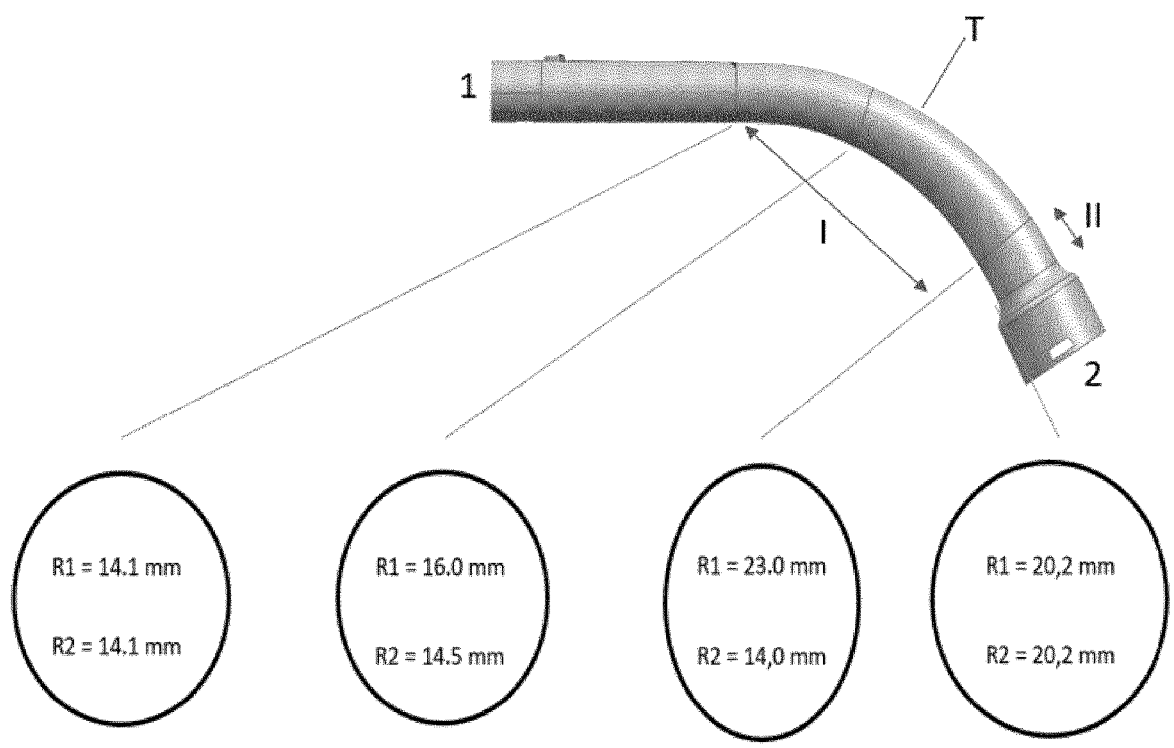

FIGS. 1 and 2 shows a transition piece according to an embodiment of the invention, which will be positioned between a tube and a hose of a vacuum cleaner.

FIG. 1 shows two views of the transition piece. The left view shows that the dimension R2 is substantially constant, while the right-hand view shows that the dimension R1 increases from a first end of the transition piece that is to be connected to the tube of the vacuum cleaner towards a second end of the transition piece that is to be connected to a hose of the vacuum cleaner. Herein, R1 is in a radial direction of a curved part of the transition piece, while R2 is in a direction perpendicular to R1.

FIG. 2 illustrates example values of R1 and R2 at several places of the transition piece, for use with a tube that has a diameter of about 14 mm and a hose that has a diameter of about 20 mm. In the example shown, it is clear that during the curve R1 increases, while R2 remains substantially constant ate about 14 mm. R2 is not exactly constant because of manufacturing constraints: there needs to be a draft angle to be able to get the product separated from the molding tools. In particular, it appears from the example values in FIG. 2 that R1 increases from the tube diameter value of about 14 mm to a value of 23 mm that exceeds the hose diameter of about 20 mm, whereafter in a final part of the transition piece the value of R1 is reduced from 23 mm to 20.2 mm while at the same time, the value of R2 increases from 14 mm to 20.2 mm. In this way, the surface of the area defined by R1 and R2 remains about the same, thereby reducing the possibilities for undesired turbulences that would jeopardize the ability to suck dust at today's limited power specifications for vacuum cleaners.

It should be noted that the above-mentioned embodiments illustrate rather than limit the invention, and that those skilled in the art will be able to design many alternative embodiments without departing from the scope of the appended claims. The notion non-circular includes not only an oval but also an ellipse. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. Measures recited in mutually different dependent claims may advantageously be used in combination.

The invention claimed is:

1. A vacuum cleaner, comprising:
    a tube having a first diameter,
    a hose having a second diameter exceeding the first diameter by at least 15%, and
    a transition piece having a first end arranged for being connected to the tube, and a second end arranged for being connected to the hose, wherein the transition piece has a curved part that has a non-circular cross-section, the curved part having a first part in which in a direction from the first end to the second end, a first dimension of the cross-section increases to a diameter exceeding the first diameter by 15%, the first dimension being in a radial direction of the curved part, while a second dimension of the cross-section, perpendicular to the first dimension, does not exceed the first diameter by more than 10%.

2. The vacuum cleaner as claimed in claim 1, wherein the transition piece has a second part, between the first part and the second end, the second part having a non-circular cross-section where the second part meets the first part, and the second part having a circular cross-section where the second part meets the second end.

3. The vacuum cleaner as claimed in claim 1, wherein in the first part, in a direction from the first end to the second end, the first dimension of the cross-section increases to a diameter exceeding the second diameter, while the second dimension stays below the second diameter.

4. The vacuum cleaner as claimed in claim 1, wherein the second diameter exceeds the first diameter by at least 25%.

5. The vacuum cleaner as claimed in claim 4, wherein the second diameter exceeds the first diameter by at least 35%.

\* \* \* \* \*